(12) United States Patent
Akashi et al.

(10) Patent No.: US 9,845,397 B2
(45) Date of Patent: Dec. 19, 2017

(54) METHOD FOR PRODUCING BINDER RESIN, METHOD FOR PRODUCING RESIN COMPOSITION, BINDER RESIN, AND RESIN COMPOSITION

(71) Applicant: SHOEI CHEMICAL INC., Shinjuku-ku, Tokyo (JP)

(72) Inventors: Ryojiro Akashi, Ome (JP); Tomoko Uchida, Ome (JP)

(73) Assignee: SHOEI CHEMICAL INC., Shinjuku-ku, Tokyo (JP)

( * ) Notice: Subject to any disclaimer, the term of this patent is extended or adjusted under 35 U.S.C. 154(b) by 0 days.

(21) Appl. No.: 15/110,590

(22) PCT Filed: Dec. 11, 2014

(86) PCT No.: PCT/JP2014/082844
§ 371 (c)(1),
(2) Date: Jul. 8, 2016

(87) PCT Pub. No.: WO2015/107811
PCT Pub. Date: Jul. 23, 2015

(65) Prior Publication Data
US 2016/0326381 A1    Nov. 10, 2016

(30) Foreign Application Priority Data

Jan. 17, 2014 (JP) ................. 2014-006537

(51) Int. Cl.
| | | |
|---|---|---|
| *H01B 1/20* | (2006.01) |
| *H01B 1/22* | (2006.01) |
| *C09D 5/24* | (2006.01) |
| *C08K 3/00* | (2006.01) |
| *C08L 71/00* | (2006.01) |
| *C09D 101/28* | (2006.01) |
| *C08L 1/28* | (2006.01) |
| *C08G 18/56* | (2006.01) |
| *C08G 18/64* | (2006.01) |
| *C08G 18/73* | (2006.01) |
| *C09D 175/04* | (2006.01) |
| *C08G 18/40* | (2006.01) |
| *C08G 65/332* | (2006.01) |
| *C08L 71/02* | (2006.01) |
| *C08G 65/331* | (2006.01) |
| *C08K 3/08* | (2006.01) |
| *C08K 3/22* | (2006.01) |
| *C09D 171/02* | (2006.01) |
| *H01B 3/30* | (2006.01) |
| *H01B 3/42* | (2006.01) |

(52) U.S. Cl.
CPC .......... *C09D 5/24* (2013.01); *C08G 18/4081* (2013.01); *C08G 18/56* (2013.01); *C08G 18/6484* (2013.01); *C08G 18/73* (2013.01); *C08G 65/331* (2013.01); *C08G 65/332* (2013.01); *C08K 3/00* (2013.01); *C08K 3/08* (2013.01); *C08K 3/22* (2013.01); *C08L 1/28* (2013.01); *C08L 71/00* (2013.01); *C08L 71/02* (2013.01); *C09D 101/28* (2013.01); *C09D 171/02* (2013.01); *C09D 175/04* (2013.01); *H01B 1/22* (2013.01); *H01B 3/302* (2013.01); *H01B 3/427* (2013.01); *C08K 2003/0862* (2013.01)

(58) Field of Classification Search
CPC ...... C08L 29/14; C08G 18/56; C08G 18/6484
See application file for complete search history.

(56) References Cited

U.S. PATENT DOCUMENTS

2006/0173105 A1*  8/2006  Griffin ............... C08L 27/06
524/35

FOREIGN PATENT DOCUMENTS

| JP | 59-045373 A | 3/1984 |
|---|---|---|
| JP | 2000-076930 A | 3/2000 |
| JP | 2001-232617 A | 8/2001 |
| JP | 2004-186339 A | 7/2004 |
| JP | 2006-202502 A | 8/2006 |
| JP | 2007-277050 A | 10/2007 |
| JP | 2008-285589 A | 11/2008 |
| JP | 2008-288332 A | 11/2008 |
| JP | 2008-294163 A | 12/2008 |
| JP | 2009-024066 A | 2/2009 |
| JP | 2009-173488 A | 8/2009 |
| JP | 2009-182128 A | 8/2009 |
| JP | 2012-174797 A | 9/2012 |
| JP | 2013-075480 A | 4/2013 |
| WO | WO 2006/100833 A1 | 9/2006 |
| WO | WO 2013/047352 A1 | 4/2013 |

OTHER PUBLICATIONS

International Search Report for PCT/JP2014/082844 (3 pgs.).

* cited by examiner

Primary Examiner — Mark Kopec
Assistant Examiner — Jaison Thomas
(74) Attorney, Agent, or Firm — Flynn, Thiel, Boutell & Tanis, P.C.

(57) ABSTRACT

A method for producing a binder resin by a reaction of a cellulose derivative, a polyvinyl acetal, and a bonding agent that has in the molecule at least two functional groups that can react to hydroxyl groups in the polyvinyl acetal and the cellulose derivative. In the production method, the content of the bonding agent is at least double the molar quantity of whichever has the greater number of moles between the polyvinyl acetal and the cellulose derivative. The produced binder resin is favorable in a coating paste such as a conductive paste, and causes an improvement in film quality such as the smoothness and denseness of a coating film formed by the paste.

21 Claims, No Drawings

METHOD FOR PRODUCING BINDER RESIN, METHOD FOR PRODUCING RESIN COMPOSITION, BINDER RESIN, AND RESIN COMPOSITION

TECHNICAL FIELD

The present invention relates to a method for producing a binder resin, a method for producing a resin composition, a binder resin, and a resin composition, and more specifically relates to a method for producing a binder resin used in coating application pastes, such as a conductive paste, and a binder resin.

BACKGROUND ART

Multilayered electronic components, such as multilayer ceramic capacitors (MLCC) are rapidly increasing in capacity and becoming smaller in size.

In MLCCs, a chip in which dielectric layers and electrode layers are alternately laminated is formed by alternately laminating multiple ceramic green sheets, which contain a high dielectric material, such as barium titanate, and multiple layers formed from a conductive paste containing mainly a conductive material, a binder resin and a solvent, and then drying and firing the obtained laminate. As MLCCs have increased in terms of capacity, there have been demands for an increase in the number of layers and a reduction in thickness of each layer, but this has led to a variety of production-related problems. Particular problems include insufficient film strength of electrode layers and insufficient adhesion to dielectric material sheets, which leads to the occurrence of defects and to peeling off of electrode layers from dielectric layer interfaces. In addition, as conductive materials become more finely particles dispersibility of the materials in binder resins is reduced, meaning that formed electrodes become non-uniform and obtained MLCCs readily suffer from problems such as reduced capacity and electrical short-circuits.

Therefore, consideration has been given to the use of a mixed resin, which is obtained by mixing a butyral-based resin or acrylic resin having excellent mechanical strength and adhesive properties to a green sheet with a cellulose derivative having excellent printability, as a binder resin for a conductive paste (see PTL (patent literature) 1). In addition, consideration has been given to the use of a specific solvent in addition to a publicly known cellulose-based resin or acrylic resin in a conductive paste (see PTL 2) and to the use of a specific acrylic resin and solvent in addition to a publicly known cellulose-based resin (see PTL 3).

PTL 4 also discloses the use of a mixed resin, and this patent literature discloses forming a ceramic green layer used to compensate for step-like sections in an electrode layer formed on a green sheet, and discloses the use of a mixture of a polyvinyl butyral and a cellulose ester as a binder resin in a ceramic slurry for this ceramic green layer used to compensate for step-like sections (see PTL 4).

CITATION LIST

Patent Literature

PTL 1: Japanese Patent Application Publication No. 2000-76930
PTL 2: Japanese Patent Application Publication No. 2006-202502
PTL 3: Japanese Patent Application Publication No. 2009-182128
PTL 4: Japanese Patent Application Publication No. 2001-232617

SUMMARY OF INVENTION

Technical Problem

However, in considering the mixed binder resins disclosed in the above-mentioned prior art, because compatibility between cellulose derivatives and other resins is low, in cases where such mixed binder resins are used in, for example, a conductive paste, phase separation and the like occurs in the conductive paste, the homogeneity of the paste and the homogeneity of a coating film formed from the paste deteriorate, dispersibility of metal particles in a coating film formed from the conductive paste deteriorates, the smoothness of the coating film deteriorates, fine holes (defects) occur in the coating film, and film qualities, such as smoothness and denseness, in a fired coating film (a metal film or the like) deteriorate.

Therefore, the primary objective of the present invention is to provide a binder resin which can be advantageously used in a paste for coating, such as a conductive paste, and which can improve film qualities, such as smoothness and denseness, in a coating film formed by using this binder resin in a paste; a method for producing this binder resin; and a method for producing a resin composition using the binder resin produced by this production method.

Solution to Problem

According to one aspect of the present invention for solving the problem mentioned above, the present invention provides:
a method for producing a binder resin, the method including:
a preparation step of preparing a cellulose derivative, a polyvinyl acetal and a bonding agent having, in the molecule, 2 or more functional groups which are able to react with hydroxyl groups in the cellulose derivative and the polyvinyl acetal in a reaction step; and
a reaction step of mixing the cellulose derivative and the polyvinyl acetal with the bonding agent in a molar quantity that is at least double the molar quantity of whichever is added in a greater number of moles between the cellulose derivative and the polyvinyl acetal, so as to bond the hydroxyl groups to the functional groups.

According to another aspect of the present invention, the present invention provides:
a method for producing a binder resin, the method including:
a preparation step of preparing a cellulose derivative, a polyvinyl acetal, an activator and a bonding agent having, in the molecule, 2 or more functional groups, which are able to react with hydroxyl groups in the cellulose derivative and the polyvinyl acetal by means of the activator;
a first stage reaction step of mixing one resin of either the cellulose derivative or the polyvinyl acetal, the activator and the bonding agent in a molar quantity that is at least double the molar quantity of whichever is added in a greater number of moles between the cellulose derivative and the polyvinyl acetal, so as to bond hydroxyl groups in the one resin to the functional groups; and
a second stage reaction step of mixing a product produced in the first stage reaction step with the other resin of either the cellulose derivative or the polyvinyl acetal and the activator, so as to bond hydroxyl groups in the other resin to the functional groups.

According to a further aspect of the present invention, the present invention provides:

a binder resin that contains a reaction product of a cellulose derivative, a polyvinyl acetal and a bonding agent having, in the molecule, 2 or more functional groups which are able to react with hydroxyl groups in the cellulose derivative and the polyvinyl acetal, wherein the content of the bonding agent is at least double the molar quantity of whichever has the greater number of moles between the cellulose derivative and the polyvinyl acetal.

Advantageous Effects of Invention

According to the present invention, it is possible to obtain a binder resin that is suitable for use in a paste for coating, and improve film qualities, such as smoothness and denseness, in a coating film formed from the paste that contains this binder resin.

DESCRIPTION OF EMBODIMENTS

Preferred aspects of the present invention will now be explained in detail. Moreover, numerical ranges indicated by the use of the symbol "-" in the present specification indicate ranges that include the numerical values mentioned before and after the symbol "-". For example, "molar quantity of 2-15 times" means the range of molar quantity of not lower than 2 times and molar quantity of not higher than 15 times.

Binder Resin

A binder resin according to a preferred embodiment of the present invention is a resin that contains a reaction product of a cellulose derivative, a polyvinyl acetal and a bonding agent having, in the molecule, 2 or more functional groups which are able to react with hydroxyl groups in the cellulose derivative and the polyvinyl acetal. The content of the bonding agent is at least double the molar quantity of whichever has the greater number of moles between the cellulose derivative and the polyvinyl acetal. By having such a constitution, compatibility between the cellulose derivative and the polyvinyl acetal resin is increased, occurrence of phase separation and the like is suppressed in a resin composition, such as a paste, obtained using the binder resin, and the homogeneity of the resin composition and the homogeneity of a coating film formed from the resin composition are improved. In addition, by forming a polymer alloy of a cellulose derivative, which exhibits excellent printability, and a polyvinyl acetal, which exhibits excellent adhesive properties and mechanical strength, it is thought that it is possible to obtain a binder resin that exhibits both printability and film strength.

The binder resin will now be explained.

Moreover, the terms "resin" and "polymer" are sometimes used to express the same thing hereinafter.

(1) Cellulose Derivative

The cellulose derivative is a polymeric material selected from among methyl cellulose, ethyl cellulose, propyl cellulose, nitrocellulose, acetyl cellulose, and the like. The use of ethyl cellulose, which exhibits excellent printability for screen printing and the like, is particularly preferred. Ethyl cellulose is obtained by subjecting cellulose to alkali treatment and ethyl etherification, and is commercially available as products in which on average 2-2.8 hydroxyl groups of the 3 hydroxyl groups present in a glucose, ring are subjected to ethyl etherification.

(2) Polyvinyl Acetal

The polyvinyl acetal is preferably polyvinyl butyral or polyvinyl formal. The polyvinyl acetal is a resin obtained by using a polyvinyl alcohol, which is obtained by hydrolyzing polyvinyl acetate, as a raw material, and acetalizing this raw material, and various polyvinyl acetals are commercially available in which hydroxyl groups and acetyl groups, in addition to acetal groups, are present at a variety of quantities in the molecules of the polyacetals.

Preferred molecular weights for the cellulose derivative and polyvinyl acetal are 10,000-500,000 in terms of number average molecular weight, and are more preferably 20,000-200,000 from the perspective of rheology characteristics desirable for pastes.

(3) Bonding Agent

The bonding agent has, in the molecule, 2 or more functional groups which are able to react with hydroxyl groups in the cellulose derivative and the polyvinyl acetal and the functional groups in the bonding agent may be reactable in the reaction step. The bonding agent may also be a bonding agent having functional groups enabled to react by addition of an activator.

The bonding agent can be a compound having a plurality of reactive functional groups and having a (poly)ethylene oxide group, an alkyl group, an alkylene group or a silicone group as the skeleton, and examples of these functional groups include carboxyl groups, isocyanate groups and acid anhydride groups. Specifically, polyfunctional isocyanate compounds, and compounds having a plurality of carboxyl groups and anhydrides thereof, and the like are used as the bonding agent.

Hexamethylene diisocyanate, tolylene diisocyanate (TDI), diphenylmethane diisocyanate (MDI), and the like, can be used as polyfunctional isocyanate compounds.

Dicarboxylic acids are preferred as the compounds having a plurality of carboxyl groups, and examples of dicarboxylic acids able to be used include phthalic acid compounds, dicarboxylic acids having 3-30 carbon atoms and anhydrides thereof, poly(ethylene glycol)bis(carboxymethyl) ether, and modified silicones having carboxyl groups or carboxylic acid anhydride groups at both terminals.

Of these, polyfunctional isocyanate compounds having sufficient reactivity or poly(ethylene glycol) bis(carboxymethyl) ether, in which a relatively long molecular chain functions as a spacer during bonding, can be advantageously used, and poly(ethylene glycol) bis(carboxymethyl) ether can be particularly preferably used.

As the poly(ethylene glycol) bis(carboxymethyl) ether, poly(ethylene glycol) bis(carboxymethyl) ethers having a number average molecular weight (Mn) of 10-10,000 can be preferably used. Polyethylene glycol) bis(carboxymethyl) ethers having Mn values of 250 and 600 produced by Sigma-Aldrich, which can be easily procured as commercial products, can be used particularly preferably.

The use of poly(ethylene glycol) bis(carboxymethyl) ether having an Mn value of 600 enables better production stability than poly(ethylene glycol) bis(carboxymethyl) ether having an Mn value of 250. This is thought to be because a poly(ethylene glycol) bis(carboxymethyl) ether having a longer chain length in some degree facilitates linking between polymers by a bonding agent.

In addition, in cases where the inclusion of the poly (ethylene glycol) bis(carboxymethyl) ether having an Mn value of 600 causes problems by affecting the adhesive properties (adhesive properties between a dielectric layer and an electrode layer in an MLCC, etc.), this problem may be solved by using the poly(ethylene glycol) bis(carboxymethyl) ether having an Mn value of 250 in some cases. In addition, the use of the poly(ethylene glycol) bis(carboxymethyl) ether having an Mn value of 250 enables a reduction in usage quantity due to the reduction in molecular weight compared to the poly(ethylene glycol) bis(carboxymethyl) ether having an Mn value of 600, and therefore the production costs can be reduced.

Hereinafter, poly(ethylene glycol) bis(carboxymethyl) ether will be referred to simply as "PEG", unless otherwise indicated.

Covalent bonding between the polyfunctional isocyanate compound and hydroxyl groups in the cellulose derivative and polyvinyl acetal readily causes urethane bonds as a result of thermal reaction. In addition, the below-mentioned reaction accelerators may be added according to need. Meanwhile, although reactions between the hydroxyl groups and compounds having a plurality of carboxyl groups, or anhydrides thereof, may occur depending on the reaction conditions, such as heating, functional groups in these compounds are made reactable with hydroxyl groups in the cellulose derivative and polyvinyl acetal by the activator, and further such reactions may be accelerated by addition of an reaction accelerator to form ester bonds. In addition, amide bonds, urea bonds and ether bonds may be formed depending on the type of functional group present in the bonding agent.

(4) Activator

Depending on the bonding agent used, the functional groups in the bonding agent are made to be able to react with hydroxyl groups in the cellulose derivative and polyvinyl acetal by the activator. For example, an activator that activates an esterification reaction, such as a carbodiimide or thionyl chloride, can be used. Specifically, in cases where PEG is used as the bonding agent, an activator that activates an esterification reaction is used, and in such cases, a reaction between the bonding agent and the hydroxyl groups is enabled by the activator.

Easily procurable compounds such as N,N'-diisopropylcarbodiimide, N,N'-dicyclohexylcarbodiimide and 1-ethyl-3-(3-dimethylaminopropyl)carbodiimide hydrochloride, and N-[3-(dimethylamino)propyl]-N'-ethylcarbodiimide, N-[3-(dimethylamino)propyl]-N'-ethylcarbodiimide methiodide, N-tert-butyl-N'-ethylcarbodiimide, N-cyclohexyl-N'-(2-morpholinoethyl)carbodiimide metho-p-toluenesulfonate, N,N'-di-tert-butylcarbodiimide, N,N'-di-p-tolylcarbodiimide, and the like, can be used as carbodiimide compounds, which are activators for esterification reactions.

Carbodiimide compounds, which are activators, cause reactions to progress efficiently when added at a quantity corresponding to the quantity of carboxyl groups in the bonding agent, which are activated so as to enable a reaction with hydroxyl groups in the cellulose derivative and polyvinyl acetal, but the carbodiimide compounds may, if necessary, be added at a quantity that exceeds this corresponding quantity.

In addition, because an esterification reaction that uses a carbodiimide compound has the advantage of progressing at a low temperature, the reaction temperature is selected within the range 0-100° C., preferably within the range 0-60° C., and more preferably within the range 0-50° C. If the upper limit for the reaction temperature exceeds 60° C. or 50° C., the reaction progresses rapidly, but because foreign matter may be generated, it is preferable to select the numerical range mentioned above. In the synthesis examples given below, in which a binder resin is synthesized in a single stage reaction or two-stage reaction using a carbodiimide compound as an activator, the target reaction time for each stage is 24 hours at 30° C., but from the perspective of productivity, the reaction time may be 6-24 hours at room temperature (25-30° C.), and a satisfactory reaction may be achieved even with a reaction time of 6 hours.

Furthermore, in a reaction that uses a carbodiimide compound, urea compounds are produced as by-products, but these may be removed from the reaction system following the reaction if necessary.

(5) Reaction Accelerator

In addition, a reaction accelerator may be added in order to accelerate the esterification reaction described above, or the like.

By adding a basic catalyst, such as dimethylaminopyridine or triethylamine, as a reaction accelerator at a quantity of 0.01-10 wt. % relative to the carbodiimide compound, the reaction time can be shortened and efficiency can be improved.

An organic solvent is generally used in the reaction described above, and the reaction is carried out with each polymer being in the form of a solution. An organic solvent not having hydroxyl groups must be used as the solvent in such cases. In cases where a solvent having a hydroxyl group is used, the bonding agent reacts with the solvent also, leading to concerns that the target product cannot be obtained.

Examples of preferred organic solvents include ether compounds such as tetrahydrofuran and dioxane, ester compounds such as ethyl acetate and butyl acetate, aromatic compounds such as toluene, ketones such as methyl ethyl ketone, methyl propyl ketone and methyl isobutyl ketone, N-methylpyrrolidone, dimethylformamide, dimethylacetamide, dimethyl sulfoxide, and mixtures thereof.

In addition, the concentration of the polymer solution during the reaction is preferably 1-50 wt. %, and more preferably 3-30 wt. % from the perspectives of reactivity and productivity. Because the viscosity of the solution varies according to the molecular weight of the polymer being used, it is preferable to optimize the concentration of the solution according to the molecular weight of the polymer. In cases where a particularly high molecular weight polymer is used, the viscosity of the solution increases, the stirring efficiency decreases and homogeneity deteriorates, and gelling is likely to occur with an increase in the added quantity of bonding agent. It is therefore preferable to adjust the concentration of the solution to an optimal value.

Moreover, in a binder resin according to a preferred embodiment of the present invention, a third polymer may be contained in addition to a product obtained by bonding the cellulose derivative and polyvinyl acetal.

An acrylic resin, an acrylic resin derivative, a polyurethane, a polyester, polystyrene, a polystyrene derivative, and the like, may be used as the third polymer. These third polymers may be incorporated either singly or in combination of a plurality thereof. The binder resin mentioned above can be obtained using the production method described below.

Method for Producing Binder Resin

The method for producing a binder resin basically comprises a step of preparing at least the above-mentioned cellulose derivative, polyvinyl acetal and bonding agent, and a step of mixing these constituent materials so as to bond hydroxyl groups in the cellulose derivative and polyvinyl acetal to functional groups in the bonding agent.

The mechanism by which the effect achieved by the present invention is achieved is not fully understood, but it is thought that the key factor to the effect lies in bonding the two different types of polymers (the cellulose derivative and polyvinyl acetal) to each other through the bonding agent.

That is, the binder resin has a structure in which hydroxyl groups in the cellulose derivative bond to functional groups in the bonding agent, hydroxyl groups in the polyvinyl acetal bond to other functional groups in the bonding agent and, as a whole, the cellulose derivative and the polyvinyl acetal are bound to each other through the bonding agent, and it is thought that the binder resin has a structure in which structural units represented by general formula (1) below are repeated.

-A-x-C-y-B-            (1)

In general formula (1), A denotes a cellulose derivative, B denotes a polyvinyl acetal and C denotes a bonding agent, which is a bonding agent having a (poly)ethylene oxide group, an alkyl group, an alkylene group or a silicone group as the skeleton. "x" and "y" each denote an ester bond, an amide bond, a urethane bond, a urea bond or an ether bond, and may be the same as, or different from, each other.

It is thought that various considerations are required in order to obtain bonds between these different polymers (the cellulose derivative and polyvinyl acetal) at a higher frequency.

In the present invention, (1) it is thought that the number of bonds between these different polymers is increased by optimizing the quantity of bonding agent added, meaning that the effect of the present invention can be achieved. In addition, (2) it is thought that by using a multistage process as the reaction process, it is possible to achieve further effects.

An explanation will now be given of an example in which PEG is used as a bonding agent.

(1) Optimizing Quantity of Bonding Agent Added

The quantity of bonding agent added is such that the molar quantity of PEG added in order to carry out a reaction is increased in relative terms relative to the molar quantity of the polymers.

In cases where each of the different polymers is present in an amount of one mole, in an ideal state in which all of the added PEG brings about a bonding reaction between the different polymers, the quantity of PEG to be added may be one mole. However, bonding reactions between the same polymers via the bonding agent and intramolecular bonding reactions brought about by plural hydroxyl groups in molecules of the polymers actually occur. In addition, because the added PEG forms multiple bonds to a single polymer molecule, polymers that do not bond to the PEG are also present. Therefore, by increasing the quantity of PEG added, it is possible to relatively increase the proportion of bonds between different polymers.

In view of experimental results, the molar quantity of PEG added must be at least double, and preferably not more than 15 times, the molar quantity of whichever is used in a greater number of moles between the two different polymers being used. If the molar quantity of PEG added is less than double that of the polymer used in a greater number of mole, the effect achieved is poor, and if the molar quantity of PEG added exceeds 15 times the molar quantity of the polymer used in a greater number of moles, an excessive degree of bonding occurs, meaning that gelling can occur. In addition, the molar quantity of PEG added is in a range of 3-10 times the above molar quantity of the polymer in order to achieve particularly excellent characteristics. In addition, the quantity of PEG introduced by means of reactions with these polymers is preferably 0.1-20 wt. % of the total quantity of the resins used in order to achieve the required physical properties. By deviating from this range, the expected improvement effects are reduced and defects can occur, such as a deterioration in adhesion properties to a dielectric layer and a deterioration in the film quality of an electrode layer formed by applying a conductive paste produced using the obtained binder resin to a dielectric layer.

A preferred blending ratio for the cellulose derivative and polyvinyl acetal used in the reaction is a cellulose derivative/polyvinyl acetal weight ratio of 10/1 to 1/10, and more preferably 5/1 to 1/5. By deviating from this range, the required physical properties may not be achieved.

(2) Multi-Stage Process

A preferred method is to carry out a multi-stage reaction, which is a method such as that described below.

First, a cellulose derivative, a polyvinyl acetal, an activator and a bonding agent (PEG in this case) having, in the molecule, 2 or more functional groups which are enabled to react with hydroxyl groups in the cellulose derivative and the polyvinyl acetal by the activator, are prepared.

One polymer of the two types of polymers (i.e., the cellulose derivative and the polyvinyl acetal), the PEG and the activator are mixed. The quantity of PEG added here is the same as in (1) above. Next, a product is prepared by preferentially bonding this polymer to one of the two carboxyl groups in the PEG (a first stage reaction). Next, the prepared product is mixed with the other polymer and the activator, and a reaction occurs between this other polymer and the unreacted carboxyl group in the PEG that is bonded to the first polymer (a second stage reaction). By carrying out this multi-stage process, it is possible to achieve preferential linking between the two polymers through the bonding agent.

Explaining in greater detail, the reaction between the carboxyl groups in the PEG and the hydroxyl groups in the two kinds of polymers can progress by addition of an activator such as carbodiimide. This reaction is preferably one such as that described below. By performing an addition reaction of 1 molecule of carbodiimide to 1 molecule of PEG, carboxyl groups in the PEG form an active state, which causes a reaction with hydroxyl groups in the polymers to progress. Because 1 molecule of PEG contains two carboxyl groups, when only one of these two carboxyl groups is activated and reacts with the hydroxyl group in one of the polymers, the other carboxyl group in the PEG remains. In the subsequent second stage reaction, the other polymer is added, together with a quantity of carbodiimide that corresponds to the number of moles of carboxyl groups remaining in the PEG, and the remaining carboxyl groups in the PEG activated by the added carbodiimide is caused to react with the hydroxyl groups in the other polymer. In this way, it is possible to preferentially react the two different kinds of polymers through the PEG.

In the second stage reaction, adding the polymer solution, which has first reacted with the bonding agent, dropwise over a period of time to a mixed solution of the other polymer and carbodiimide and bringing about a reaction are also preferred in order to be able to preferentially bring about a bonding reaction between the different polymers through the bonding agent with better efficiency.

In a multi-stage process, in order to carry out a bonding reaction between the different polymers through the bonding agent with better efficiency, it is also effective to add the PEG in excess quantity relative to the carbodiimide in the first stage reaction described above. As mentioned above, the esterification reaction is greatly affected by the carbodiimide as an activator. Therefore, the quantity of PEG bonded to the cellulose derivative and polyvinyl acetal polymers can be controlled by adjusting the quantity of carbodiimide. As a result, by adding an excess quantity of PEG relative to the carbodiimide, a reaction intermediate, in which only one of the two carboxyl groups present in a PEG molecule is activated, is preferentially produced in a high probability, and a product, in which one activated carboxyl group in the PEG is bonded to a hydroxyl group in one polymer, with the other carboxyl group in the bonding agent remaining, can be obtained more reliably.

In cases where PEG is not added in excess relative to the carbodiimide in the first stage reaction, that is, in cases where less than 1 mole of PEG is added relative to 1 mole of carbodiimide, an intermediate, in which both carboxyl groups in the PEG are activated, is produced in a high probability. As a result, intramolecular polymer reactions through the PEG or reactions between the same type of polymer by the activated PEG readily occur in the first stage reaction, a product in which the other carboxyl group reliably remains is hardly produced, and, as a result, there is a possibility that the efficiency of the bonding reaction between the different types of polymers through the bonding agent in the second stage reaction will decrease. In cases where an excess of PEG is added, the molar quantity of PEG is preferably 2-10 times the molar quantity of the carbodiimide added in the first stage reaction. If this added molar quantity is less than 2 times, no significant effect is seen in terms of generating PEG in which only one carboxyl group is activated. Meanwhile, if this added molar quantity is greater than 10 times, costs increase due to a large quantity of PEG being used.

As mentioned above with respect to the activator, in cases where an excess of PEG is added, because unbonded PEG remains in the reaction system in the first stage or second stage, it is preferable to carry out a purification process in order to remove this PEG. It is preferable to provide a step in which unreacted PEG is removed between the first stage reaction and the second stage reaction. This removal treatment can generally be carried out by means of precipitation purification using a poor solvent.

Moreover, in a single stage process (one stage process) or multi-stage process, the total molar quantity of carbodiimide added is preferably 1.5-2.5 times the number of moles of PEG added.

Following the reaction, it is preferable for the product to be purified by means of a precipitation purification method. A precipitation purification method is one in which the produced polymer is placed in a poor solvent to the polymer so as to generate a solid precipitate, and the obtained solid precipitate is then removed. Due to precipitation purification, unreacted substances or byproducts can be separated. For the reaction product in the present invention, purification can be carried out using water, methanol, a mixed water-methanol solution, hexane, and the like. The precipitate can be obtained as a solid by separation through filtration or the like, and then drying.

(3) Analysis of Success/Failure of Reaction and Product

The success or failure of the reaction between the PEG and the two different types of polymers and the reaction product can be analyzed by FT-IR (infrared spectroscopy) analysis of the product, $^1$H-NMR or $^{13}$C NMR analysis, solution viscosity measurements, changes in elution times in GPC (gel permeation chromatography) analysis, and the like.

NMR analysis in particular can quantitatively analyze the compositional proportions of the respective components in the generated composition. For example, because it is possible to quantitatively analyze spectra (chemical shift values and intensities) derived from chemical structures that are intrinsic to each component by means of $^1$H-NMR or $^{13}$C NMR analysis, it is possible to quantitatively determine the quantities of the three components, i.e., the cellulose derivative, the polyvinyl acetal and the PEG bonded to these polymers.

[Resin Composition and Method for Producing Same]

In a preferred embodiment of the present invention, it is possible to provide a resin composition by means of a production method having a step of preparing the binder resin obtained using the binder resin production method described above, inorganic particles and an organic solvent, and a step of kneading the binder resin, inorganic particles and organic solvent.

A paste for coating is an example of this resin composition, which contains a variety of components according to the intended use of the composition. Examples of pastes for coating include conductive pastes, dielectric pastes, resistive pastes and insulating pastes.

Conductive pastes contain the binder resin, electrically conductive particles, an organic solvent and additives added according to need, such as a surfactant. Meanwhile, dielectric pastes, resistive pastes and insulating pastes contain dielectric particles of barium titanate or the like, electrically resistive particles such as ruthenium oxide or the like, glass particles or the like, respectively, instead of electrically conductive particles.

Because the binder resin of the present invention is highly homogeneous, as mentioned above, a coating film formed from a paste, such as a conductive paste produced using this binder resin, exhibits high dispersibility of inorganic particles such as metal particles and has a low viscosity ratio, and therefore achieves excellent coating film smoothness and resistance to formation of fine holes (defects). Therefore, it is possible to greatly improve the film qualities such as smoothness, denseness, etc., in a fired coating film (a metal film or the like).

A detailed explanation will now be given using a conductive paste as an example.

The electrically conductive particles are not particularly limited, and examples thereof include metal particles such as nickel, copper, cobalt, gold, silver, palladium and platinum, and particles of alloys of these metals. It is also possible to use electrically conductive metal oxide or composite particles obtained by coating an inorganic powder of glass, ceramic, fluorescent material, semiconductor or the like with metal. In addition, it is also possible to use particles having a thin oxide film on the surface of these metal particles or alloy particles, or particles obtained by adhering a glass material or a variety of oxides on the surface of the above metal particles or alloy particles in order to suppress excessive sintering. These electrically conductive particles may be used either singly or as a mixture of two or more types thereof. In addition, the electrically conductive particles may be used after being subjected to surface treatment using an organometallic compound, a surfactant, a fatty acid, or the like, if necessary.

The particle size of the electrically conductive particles is not particularly limited, and it is preferable to use electrically conductive particles having an average particle size of about 3 μm or less, such as those used in conventional conductive pastes for internal electrodes. In order to form a thin internal electrode layer having high denseness and smoothness, it is preferable to use highly dispersible fine particles having an average particle size of about 0.05-1.0 µm. In particular, in cases where extremely fine electrically conductive particles of nickel or the like having an average particle size of 0.5 µm or less are used to form an internal electrode for a multilayered laminated capacitor, the present invention achieves a remarkable effect.

A preferred blending ratio for the conductive particles and the binder resin is a conductive particle/binder resin weight ratio of 99/1 to 80/20.

Examples of organic solvents include ketones such as methyl ethyl ketone, methyl isobutyl ketone and acetone, hydrocarbons such as toluene, xylene and n-hexane, alcohols such as methanol, ethanol, isopropanol, butanol, amyl alcohol and benzyl alcohol, esters such as ethyl acetate, butyl acetate and isobutyl acetate; tetrahydrofuran, dioxane, diisopropyl ketone, ethyl cellosolve, butyl cellosolve, cellosolve acetate, methyl cellosolve acetate, butyl carbitol, trimethyl pentanediol monoisobutyrate, cyclohexanol, pine oil, isophorone, terpineol, dipropylene glycol, dimethyl phthalate, hydrocarbons, chlorinated hydrocarbons such as methylene chloride, terpineol derivatives such as dihydroterpineol, terpineol acetate and dihydroterpineol acetate, and mixtures thereof.

It is preferable for the blending quantity of organic solvent to be 1-100 times the weight of the binder resin being used.

Examples of other substances able to be added if necessary include non-ionic surfactants such as polyethylene glycol derivatives and sorbitan esters; glass particles, dielectric particles, ceramic particles; stabilizers such as antioxidants; pigments and dyes. It is preferable for the added quantity of these additives to be selected within the range 0.01-10 wt. % relative to the weight of the paste.

The conductive paste can be produced by blending the above-mentioned conductive particles, binder resin and organic solvent at prescribed proportions, and then kneading in a stirring device such as a mixer or a mill, three rolls, a Hoover Muller, or the like.

A detailed description has been given above using a conductive paste as an example, but other types of pastes for coating can be produced in the same way by blending and designing the various types of particles mentioned above instead of the electrically conductive particles.

The present invention will now be explained through the use of detailed examples.

Example 1

[Preparation of Sample (Conductive Paste)]
(1) Synthesis of Binder Resin

Synthesis Example 1

10 g of ethyl cellulose (STD 200 manufactured by Dow Chemical Company, number average molecular weight Mn=80,000) and 10 g of polyvinyl butyral (BM-S manufactured by Sekisui Chemical Co., Ltd., number average molecular weight Mn=53,000), which had been thoroughly dried by reduced-pressure drying, were homogeneously dissolved in 200 g of 1,4-dioxane (manufactured by Wako Pure Chemical Industries, Ltd.).

To the thus obtained solution, 0.16 g (molar quantity of 5 times the number of moles of the polyvinyl butyral) of hexamethylene diisocyanate (manufactured by Wako Pure Chemical Industries, Ltd., Mn=168.2) was added as a bonding agent, and subjected to reaction by heating under stirring for 24 hours at 60° C.

When the obtained product was subjected to GPC analysis, it shifted to a higher molecular weight side in comparison with the polymer mixture of ethyl cellulose and polyvinyl butyral (that is, a polymer mixture obtained by simply mixing the ethyl cellulose and the polyvinyl butyral prepared as raw material components at the blending ratio mentioned above). Furthermore, when the viscosity of the obtained product was measured, it was found that the viscosity was higher after the reaction.

Unless otherwise indicated, GPC analyses of the respective products obtained in the synthesis examples and comparative synthesis examples were compared with GPC analysis results for polymer mixtures of ethyl cellulose and polyvinyl butyral having the blending proportions in the respective examples, in the same way as mentioned above. All the GPC analyses were carried out using tetrahydrofuran (THF) as an eluent, and the concentrations in the THF of each product and the polymer mixture compared with the product were the same.

Synthesis Example 2

15 g of ethyl cellulose (STD 200 manufactured by Dow Chemical Company, number average molecular weight Mn=80,000) and 10 g of polyvinyl butyral (BM-S manufactured by Sekisui Chemical Co., Ltd., number average molecular weight Mn=53,000), which had been thoroughly dried by reduced-pressure drying, were homogeneously dissolved in 250 g of 1,4-dioxane (manufactured by Wako Pure Chemical Industries, Ltd.).

To the thus obtained solution, 0.34 g (molar quantity of 3 times the number of moles of the polyvinyl butyral) of PEG (manufactured by Sigma-Aldrich, Mn=600), 0.143 g (molar quantity of 2 times the number of moles of the PEG) of N,N'-diisopropylcarbodiimide (manufactured by Wako Pure Chemical Industries, Ltd.) as a carboxyl group activator and 1 mg of 4-dimethylaminopyridine as a reaction accelerator were added, and subjected to reaction under stirring for 24 hours at 30° C. Following completion of the reaction, the solution was filtered under reduced pressure so as to remove by-produced urea, and then vacuum dried.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 3

In Synthesis Example 2, the quantity of PEG (manufactured by Sigma-Aldrich, Mn=600) as a bonding agent was changed to 0.566 g (molar quantity of 5 times the number of moles of the polyvinyl butyral, and the quantity of N,N'-diisopropylcarbodiimide (manufactured by Wako Pure Chemical Industries, Ltd.) as a carboxyl group activator was changed to 0.24 g (molar quantity of 2 times the number of moles of the PEG).

With the exception of the above, a binder resin was synthesized by the same reaction and operation as in Synthesis Example 2.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 4

In Synthesis Example 2, the quantity of PEG (manufactured by Sigma-Aldrich, Mn=600) as a bonding agent was changed to 0.792 g (molar quantity of 7 times the number of moles of the polyvinyl butyral), and the quantity of N,N'-diisopropylcarbodiimide (manufactured by Wako Pure Chemical Industries, Ltd.) as a carboxyl group activator was changed to 0.34 g (molar quantity of 2 times the number of moles of the PEG).

With the exception of the above, a binder resin was synthesized by the same reaction and operation as in Synthesis Example 2.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 5

In Synthesis Example 3, the quantity of N,N'-diisopropylcarbodiimide (manufactured by Wako Pure Chemical Industries, Ltd.) as a carboxyl group activator was changed to 0.313 g (molar quantity of 2.5 times the number of moles of the PEG).

With the exception of the above, a binder resin was synthesized by the same reaction and operation as in Synthesis Example 2.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 6

In Synthesis Example 3, the quantity of ethyl cellulose (STD 200 manufactured by Dow Chemical Company, number average molecular weight Mn=80,000), which had been thoroughly dried by reduced-pressure drying, was changed to 10 g, and the quantity of 1,4-dioxane (manufactured by Wako Pure Chemical Industries, Ltd.) was changed to 200 g.

With the exception of the above, a binder resin was synthesized by the same reaction and operation as in Synthesis Example 2.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 7

In Synthesis Example 3, 0.236 g (molar quantity of 5 times the number of moles of the polyvinyl butyral) of PEG having an Mn value of 250 (manufactured by Sigma-Aldrich) was used as a bonding agent instead of the PEG having an Mn value of 600.

With the exception of the above, a binder resin was synthesized by the same reaction and operation as in Synthesis Example 2.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 8

In Synthesis Example 7, the quantity of ethyl cellulose (STD 200 manufactured by Dow Chemical Company, number average molecular weight Mn=80,000), which had been thoroughly dried by reduced-pressure drying, was changed to 10 g, and the quantity of 1,4-dioxane (manufactured by Wako Pure Chemical Industries, Ltd.) was changed to 200 g.

With the exception of the above, a binder resin was synthesized by the same reaction and operation as in Synthesis Example 2.

When the obtained product was subjected to GPC analysis, it shifted to a high molecular weight side in comparison to the polymer mixture of ethyl cellulose and polyvinyl butyral. Furthermore, when the viscosity of the obtained product was measured, it was found that the viscosity was higher after the reaction.

Synthesis Example 9 (Two-Stage Reaction)

10 g of polyvinylbutyral (BM-S manufactured by Sekisui Chemical Co., Ltd., number average molecular weight Mn=53,000), which had been thoroughly dried by reduced-pressure drying, was homogeneously dissolved in 100 g of 1,4-dioxane (manufactured by Wako Pure Chemical Industries, Ltd.). 0.566 g (molar quantity of 5 times the number of moles of the polyvinylbutyral) of PEG (manufactured by Sigma-Aldrich, Mn=600) as a bonding agent, 0.12 g (the same molar quantity as the PEG) of N,N'-diisopropylcarbodiimide (manufactured by Wako Pure Chemical Industries, Ltd.) as a carboxyl group activator and 1 mg of 4-dimethylaminopyridine as a reaction accelerator were added to, and mixed with, the solution obtained above, and subjected to reaction under stirring for 24 hours at 30° C. to perform a first stage reaction.

Next, a solution was prepared by homogeneously dissolving 15 g of ethyl cellulose (STD 200 manufactured by Dow Chemical Company, number average molecular weight Mn=80,000) in 150 g of 1,4-dioxane (manufactured by Wako Pure Chemical Industries, Ltd.), 0.12 g (the same molar quantity as the PEG) of N,N'-diisopropylcarbodiimide (manufactured by Wako Pure Chemical Industries, Ltd.) was added to, and dissolved in, the obtained solution. The thus obtained solution was mixed with the previous polyvinyl butyral reaction solution, and subjected to reaction under stirring for 24 hours at 30° C. to perform a second stage reaction. Following completion of the reaction, the solution was filtered under reduced pressure so as to remove by-produced urea, and then dried under reduced pressure.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 10 (Two-Stage Reaction)

In Synthesis Example 9, the quantity of ethyl cellulose (STD 200 manufactured by Dow Chemical Company, number average molecular weight Mn=80,000), which had been thoroughly dried by reduced-pressure drying, was changed to 10 g, and the quantity of 1,4-dioxane (manufactured by Wako Pure Chemical Industries, Ltd.) used in the second stage reaction was changed to 100 g.

With the exception of the above, a binder resin was synthesized by the same reaction and operation as in Synthesis Example 9.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 11 (Two-Stage Reaction)

In Synthesis Example 9, the quantity of PEG (manufactured by Sigma-Aldrich, Mn=600) as a bonding agent was changed to 0.226 g (molar quantity of 2 times the number of moles of the polyvinyl butyral, and the quantity of N,N'-diisopropylcarbodiimide (manufactured by Wako Pure Chemical Industries, Ltd.) as a carboxyl group activator was changed to 0.048 g (the same molar quantity as the PEG) in both the first stage and the second stage.

With the exception of the above, a binder resin was synthesized by the same reaction and operation as in Synthesis Example 9.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 12 (Two-Stage Reaction)

In Synthesis Example 9, 0.236 g (molar quantity of 5 times the number of moles of the polyvinyl butyral) of PEG having an Mn value of 250 (manufactured by Sigma-Aldrich) was used as a bonding agent instead of the PEG having an Mn value of 600.

With the exception of the above, a binder resin was synthesized by the same reaction and operation as in Synthesis Example 9.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 13 (Two-Stage Reaction)

In Synthesis Example 10, 0.236 g (molar quantity of 5 times the number of moles of the polyvinyl butyral) of PEG having an Mn value of 250 (manufactured by Sigma-Aldrich) was used as a bonding binder instead of the PEG having an Mn value of 600.

With the exception of the above, a binder resin was synthesized by the same reaction and operation as in Synthesis Example 10.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 14 (Two-Stage Reaction)

In Synthesis Example 11, the quantity of 1,4-dioxane (manufactured by Wako Pure Chemical Industries, Ltd.) was changed to 50 g in the first stage and 75 g in the second stage.

With the exception of the above, a binder resin was synthesized by the same reaction and operation as in Synthesis Example 9.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Synthesis Example 15 (Two-Stage Reaction in which an Excess of PEG was Added))

10 g of polyvinyl butyral (BM-S manufactured by Sekisui Chemical Co., Ltd., number average molecular weight Mn=53,000), which had been thoroughly dried by reduced-pressure drying, was homogeneously dissolved in 100 g of 1,4-dioxane (manufactured by Wako Pure Chemical Industries, Ltd.). To the obtained solution, 1.7 g (molar quantity of 15 times the number of moles of the polyvinyl butyral) of PEG (manufactured by Sigma-Aldrich, Mn=600) as a bonding agent, 71 mg (molar quantity of ⅕th the number of moles of the PEG) of N,N'-diisopropylcarbodiimide (manufactured by Wako Pure Chemical Industries, Ltd.) as a carboxyl group activator and 1 mg of 4-dimethylaminopyridine as a reaction accelerator were added, and subjected to reaction under stirring for 24 hours at 30° C. to perform a first stage reaction. Following the reaction, water/methanol (2/1 in terms of volume ratio) was added dropwise as a precipitation solvent to the reaction solution, and the obtained precipitate was filtered, washed and then dried under reduced pressure so as to remove unreacted and unbonded PEG and the like, and purify the product.

5 g of the obtained polyvinyl butyral containing PEG chains was homogeneously dissolved in 50 g of 1,4-dioxane (manufactured by Wako Pure Chemical Industries, Ltd.).

A mixed solution was prepared by dissolving 5 g of ethyl cellulose (STD 200 manufactured by Dow Chemical Company, number average molecular weight Mn=80,000) in 50 g of 1,4-dioxane, and adding 36 mg of N,N'-diisopropylcarbodiimide (manufactured by Wako Pure Chemical Industries, Ltd.) and 1 mg of 4-dimethylaminopyridine, and the PEG-containing polyvinyl butyral solution was added dropwise to, and mixed with, this mixed solution under stirring at 30° C. over a period of 1 hour. Following completion of the dropwise addition, a second stage reaction was carried out by reaction under stirring for 24 hours at 30° C. Following completion of the reaction, the solution was filtered under reduced pressure so as to remove by-produced urea, and then dried under reduced pressure.

When the obtained product was subjected to GPC analysis, it shifted to a higher molecular weight side in comparison with the polymer mixture of ethyl cellulose and polyvinyl butyral. Furthermore, when the viscosity of the obtained product was measured, it was found that the viscosity was higher after the reaction.

Comparative Synthesis Example 1

In Synthesis Example 3, the N,N'-diisopropylcarbodiimide as a carboxyl group activator and the 4-dimethylaminopyridine as a reaction accelerator were not added.

With the exception of the above, a binder resin was synthesized by the same reaction and operation as in Synthesis Example 2.

When the obtained product was subjected to GPC analysis, there was almost no change in molecular weight in comparison with the polymer mixture of ethyl cellulose and polyvinyl butyral.

Comparative Synthesis Example 2

In Synthesis Example 2, the quantity of PEG (manufactured by Sigma-Aldrich, Mn=600) as a bonding agent was changed to 0.113 g (the same molar quantity as the polyvinyl butyral), and the quantity of N,N'-diisopropylcarbodiimide (manufactured by Wako Pure Chemical Industries, Ltd.) as a carboxyl group activator was changed to 0.049 g (molar quantity of 2 times the number of moles of the PEG).

With the exception of the above, a binder resin was synthesized by the same reaction and operation as in Synthesis Example 2.

When the obtained product was subjected to GPC analysis, no significant change in molecular weight could be confirmed in comparison with the polymer mixture of ethyl cellulose and polyvinyl butyral.

Comparative Synthesis Example 3

In Synthesis Example 2, the quantity of PEG (manufactured by Sigma-Aldrich, Mn=600) as a bonding agent was changed to 1.81 g (molar quantity of 16 times the number of moles of the polyvinyl butyral), and the quantity of N,N'-diisopropylcarbodiimide (manufactured by Wako Pure Chemical Industries, Ltd.) as a carboxyl group activator was changed to 0.762 g (molar quantity of 2 times the number of moles of the PEG).

An attempt was made to synthesize a binder resin by the same reaction and operation as in Synthesis Example 2 except for the above changes, but the viscosity increased and gelling occurred 1 hour after the start of the reaction, and it was found that the reaction product could not be used as a binder resin. This shows that in cases where the quantity of bonding agent is excessively high, a crosslinking reaction progresses to cause gelling.

Comparative Synthesis Example 4

10 g of polyvinyl butyral (BM-S manufactured by Sekisui Chemical Co., Ltd., number average molecular weight Mn=53,000), which had been thoroughly dried by reduced-pressure drying, was homogeneously dissolved in 100 g of 1,4-dioxane (manufactured by Wako Pure Chemical Industries, Ltd.).

0.566 g (molar quantity of 5 times the number of moles of the polyvinyl butyral) of PEG (manufactured by Sigma-Aldrich, Mn=600) as a bonding agent, 0.24 g (molar quantity of 2 times the number of moles of the PEG) of N,N'-diisopropylcarbodiimide (manufactured by Wako Pure Chemical Industries, Ltd.) as a carboxyl group activator and 1 mg of 4-dimethylaminopyridine as a reaction accelerator were added to, and mixed with, the solution obtained above, and subjected to reaction under stirring for 24 hours at 30° C. (the process up to this point is referred to as "the first stage reaction in this comparative synthesis example").

When the reaction product was subjected to GPC analysis, it shifted to a higher molecular weight side in comparison with the polyvinyl butyral. Furthermore, when the viscosity of the obtained product was measured, it was found that the viscosity was higher after the reaction.

Next, a solution was prepared by homogeneously dissolving 15 g of ethyl cellulose (STD 200 manufactured by Dow Chemical Company, number average molecular weight Mn=80,000) in 150 g of 1,4-dioxane (manufactured by Wako Pure Chemical Industries, Ltd.), and this solution was mixed with the previous polyvinyl butyral reaction solution, and stirred for 24 hours at 30° C. Next, the solution was filtered under reduced pressure so as to remove by-produced urea, and then vacuum dried.

Comparative Synthesis Example 5

A comparison was made by carrying out the first stage reaction in this comparative synthesis example using ethyl cellulose unlike the reaction order in Comparative Synthesis Example 4.

A solution was prepared by homogeneously dissolving 15 g of ethyl cellulose (STD 200 manufactured by Dow Chemical Company, number average molecular weight Mn=80,000) in 150 g of 1,4-dioxane (manufactured by Wako Pure Chemical Industries, Ltd.) then 0.566 g (molar quantity of 5 times the number of moles of polyvinyl butyral mixed in the later stage) of PEG (manufactured by Sigma-Aldrich, Mn=600), 0.24 g (molar quantity of 2 times the number of moles of the PEG) of N,N'-diisopropylcarbodiimide (manufactured by Wako Pure Chemical Industries, Ltd.) as a carboxyl group activator and 1 mg of 4-dimethylaminopyridine as a reaction accelerator were added to, and mixed with, the obtained solution, and subjected to reaction under stirring for 24 hours at 30° C. to perform a first stage reaction in this comparative synthesis example.

When the reaction product was subjected to GPC analysis, it shifted to a higher molecular weight side in comparison with the ethyl cellulose. Furthermore, when the viscosity of the obtained product was measured, it was found that the viscosity was higher after the reaction.

Next, a solution was prepared by homogeneously dissolving 10 g of polyvinyl butyral (BM-S manufactured by Sekisui Chemical Co., Ltd., number average molecular weight Mn=53,000) in 100 g of 1,4-dioxane (manufactured by Wako Pure Chemical Industries, Ltd.), and this solution was mixed with the previous ethyl cellulose reaction solution, and stirred for 24 hours at 30° C. Next, the solution was filtered under reduced pressure so as to remove by-produced urea, and then vacuum dried.

Comparative Synthesis Example 6

15 g of ethyl cellulose (STD 200 manufactured by Dow Chemical Company, number average molecular weight Mn=80,000) and 10 g of polyvinyl butyral (BM-S manufactured by Sekisui Chemical Co., Ltd., number average molecular weight Mn=53,000), which had been thoroughly dried by reduced-pressure drying, were homogeneously dissolved in 250 g of 1,4-dioxane (manufactured by Wako Pure Chemical Industries, Ltd.), and this solution was stirred for 24 hours at 30° C. The solution was then dried under reduced pressure.

Comparative Synthesis Example 7

In Comparative Synthesis Example 6, the quantity of ethyl cellulose (STD 200 manufactured by Dow Chemical Company, number average molecular weight Mn=80,000) was changed to 10 g, and the quantity of 1,4-dioxane (manufactured by Wako Pure Chemical Industries, Ltd.) was changed to 200 g.

With the exception of the above, the same operation as described in Comparative Synthesis Example 6 was conducted.

(2) Preparation of Conductive Paste (2.1) Examples 1-1 to 1-15 and Comparative Examples 1-1 to 1-7

Conductive paste samples of Examples 1-1 to 1-15 and Comparative Examples 1-1 to 1-7 were obtained by preparing conductive pastes in which the binder resins prepared in Synthesis Examples 1-15 and Comparative Synthesis Examples 1-7 were dispersed in an organic solvent together with nickel particles.

When preparing these samples, the conductive pastes were prepared with the blending proportions shown below by kneading using three rolls.

Nickel particles (manufactured by Shoei Chemical, Inc. volume average particle size, as measured by a laser scattering method ($D_{50}$): 0.3 μm): 100 parts by weight Binder resin: 8 parts by weight Organic solvent (dihydroterpineol, manufactured by Nippon Terpene Chemicals, Inc.): 100 parts by weight (2.2) Comparative Examples 1-8 to 1-9

Nickel particle-containing conductive pastes were prepared by adding PEG (manufactured by Sigma-Aldrich, Mn=600) as a bonding agent in a molar quantity of 5 times the number of moles of the polyvinyl butyral when kneading the nickel particles, binder resin and organic solvent in Comparative Examples 1-6 to 1-7.

Evaluation of Samples

Each of the conductive pastes was coated on a glass substrate at a coating film thickness of 30 μm, and then dried for 5 minutes at 130° C.

The Ra value of the dried coating film was determined from surface roughness data, using an AFM (atomic force microscope, manufactured by Keyence Corporation).

In addition, the film qualities of the dried coating film were evaluated by observing the size of holes and the number of holes for a specific area (the number of defect holes measuring less than 0.5 μm×0.5 μm in a field of view measuring 20 μm×20 μm) using an SEM (scanning electron microscope, manufactured by JEOL Ltd.). The indexes for film quantity evaluation by SEM observation are as follows.

"○": 5 or fewer
"Δ": 6-10
"x": 11 or more, or the presence of holes measuring at least 0.5 μm×0.5 μm Furthermore, the conductive paste was cast on a glass substrate at a coating film thickness of 100 μm and dried, and the film density was calculated from the volume and weight of the film.

The evaluation results are shown in Tables 1 to 2.

TABLE 1

| Conductive paste sample (dried coating film) | Binder resin | Surface roughness Ra (nm) | Film quality Evaluation by SEM observation | Film density (g/cm³) |
| --- | --- | --- | --- | --- |
| Example 1-1 | Synthesis Example 1 | 95 | Δ | 5.6 |
| Example 1-2 | Synthesis Example 2 | 85 | ○ | 5.7 |
| Example 1-3 | Synthesis Example 3 | 80 | ○ | 5.8 |
| Example 1-4 | Synthesis Example 4 | 83 | ○ | 5.7 |
| Example 1-5 | Synthesis Example 5 | 80 | ○ | 5.8 |
| Example 1-6 | Synthesis Example 6 | 83 | ○ | 5.7 |
| Example 1-7 | Synthesis Example 7 | 82 | ○ | 5.7 |
| Example 1-8 | Synthesis Example 8 | 84 | ○ | 5.7 |
| Example 1-9 | Synthesis Example 9 | 78 | ○ | 5.8 |
| Example 1-10 | Synthesis Example 10 | 79 | ○ | 5.8 |
| Example 1-11 | Synthesis Example 11 | 82 | ○ | 5.7 |
| Example 1-12 | Synthesis Example 12 | 80 | ○ | 5.8 |
| Example 1-13 | Synthesis Example 13 | 81 | ○ | 5.8 |
| Example 1-14 | Synthesis Example 14 | 80 | ○ | 5.8 |
| Example 1-15 | Synthesis Example 15 | 76 | ○ | 5.8 |

TABLE 2

| Conductive paste sample (dried coating film) | Binder resin | Surface roughness Ra (nm) | Film quality evaluation by SEM observation | Film density (g/cm³) |
| --- | --- | --- | --- | --- |
| Comparative Example 1-1 | Comparative Synthesis Example 1 | 101 | x | 5.5 |
| Comparative Example 1-2 | Comparative Synthesis Example 2 | 102 | x | 5.5 |
| Comparative Example 1-3 | Comparative Synthesis Example 3 | — | — | — |
| Comparative Example 1-4 | Comparative Synthesis Example 4 | 110 | x | 5.3 |
| Comparative Example 1-5 | Comparative Synthesis Example 5 | 112 | x | 5.2 |
| Comparative Example 1-6 | Comparative Synthesis Example 6 | 100 | x | 5.5 |
| Comparative Example 1-7 | Comparative Synthesis Example 7 | 112 | x | 5.4 |
| Comparative Example 1-8 | Comparative Synthesis Example 6 | 101.3 | x | 5.5 |
| Comparative Example 1-9 | Comparative Synthesis Example 7 | 105.5 | x | 5.4 |

Conclusion

In view of the evaluation indexes for Ra (surface roughness), number and size of holes (defects) determined from SEM observations and film density, it was clear that Examples 1-1 to 1-15 using the binder resins of the present invention, were greatly improved in terms of film qualities such as dried coating film smoothness and denseness compared with Comparative Examples 1-1 to 1-9. In addition, similar results were achieved by a product prepared in the same way as in, for example, Synthesis Example 2, except that the reaction accelerator 4-dimethylaminopyridine was not added and the reaction time was 72 hours.

In particular, comparing Examples 1-2 to 1-4 with Comparative Example 1-2, Comparative Example 1-2 exhibited poor results, and it is thought that in cases where the added quantity of PEG is the same molar quantity as whichever has the greater number of moles between the two types of polymers, there is insufficient bonding between the two different polymers.

Comparing Example 1-9 with Comparative Examples 1-4 to 1-5, it was confirmed that Comparative Examples 1-4 to 1-5 exhibited extremely poor characteristics as a paste. That is, it was confirmed that in cases where the entire quantity of N,N'-diisopropylcarbodiimide was added in the first stage without being dividedly added in the first stage and second stage, the effect of the present invention was not achieved.

The inventors of the present invention assume that the reason for this is as follows.

In Comparative Synthesis Examples 4 and 5, in which the binder resins used in Comparative Examples 1-4 to 1-5 were synthesized, it is thought that all the carboxyl groups in the PEG were activated in the first stage reaction, and that almost all the carboxyl groups reacted with the polymer in the first stage reaction. In addition, because almost no unreacted carboxyl groups remained in the PEG, it is thought that a reaction between the PEG and the polymer hardly occurred in the second stage reaction, and that most of the polymer reaction product generated through bonding to the PEG was a polymer in which bonding between the same type of polymer occurred through the PEG or a polymer which is produced by intramolecular reaction of the polymer added in the first stage through the PEG. However, in Synthesis Example 9, in which the binder resin used in Example 1-9 was synthesized, it is thought that only half of all the carboxyl groups in the PEG were activated in the first stage reaction and the remaining half of the carboxyl groups were activated in the second stage reaction, meaning that a reaction between the PEG and the polymer also occurred in the second stage reaction. That is, most of the polymer reaction product generated through bonding to the PEG was a reaction product in which the two different polymers were linked to each other through the PEG, and it is thought that this is the key to the present invention. More specifically, it is thought that the key to the present invention is a reaction product in which the ethyl cellulose and the polyvinyl butyral are linked to each other through the PEG.

In addition, comparing Example 1-1 with Examples 1-2 to 1-15, better results were obtained using PEG than by using hexamethylene diisocyanate. Comparing Example 1-3 with Example 1-7, better results were obtained using PEG having a number average molecular weight Mn of 600 than by using PEG having a number average molecular weight Mn of 250. These results show that a bonding agent having a long chain length in some degree facilitates bonding between the different polymers.

Furthermore, comparing Example 1-3 with Example 1-9, Example 1-6 with Example 1-10, Example 1-7 with Example 1-12 or Example 1-8 with Example 1-13, better results were achieved by two-stage reactions than by single stage reactions. In addition, Example 1-15 achieved the best results among all the examples. This shows that bonding between the different polymers occurs efficiently when carrying out a two-stage reaction, and especially a two-stage reaction in which an excess of PEG is used.

Example 2

Preparation and Evaluation of Samples (Glass Pastes)

Samples of Examples 2-1 to 2-5 and Comparative Examples 2-1 to 2-2 were obtained by preparing glass pastes under the same conditions as those used when preparing the conductive pastes of Examples 1-2 to 1-6 and Comparative Examples 1-6 to 1-7, except that bismuth oxide-based low melting point glass particles ($D_{50}$=2 µm) were used instead of nickel particles.

These glass pastes were processed and evaluated in the same way as the conductive pastes. The evaluation results are shown in Table 3.

TABLE 3

| Glass paste sample (dried coating film) | Binder resin | Surface roughness Ra (nm) | Film quality evaluation by SEM observation | Film density (g/cm$^3$) |
| --- | --- | --- | --- | --- |
| Example 2-1 | Synthesis Example 2 | 105 | ○ | 5.5 |
| Example 2-2 | Synthesis Example 3 | 100 | ○ | 5.6 |
| Example 2-3 | Synthesis Example 4 | 105 | ○ | 5.5 |
| Example 2-4 | Synthesis Example 5 | 102 | ○ | 5.6 |
| Example 2-5 | Synthesis Example 6 | 110 | ○ | 5.5 |
| Comparative Example 2-1 | Comparative Synthesis Example 6 | 130 | x | 5.3 |
| Comparative Example 2-2 | Comparative Synthesis Example 7 | 142 | x | 5.2 |

Conclusion

In view of the evaluation indexes for Ra (surface roughness) and number and size of holes (defects) determined from SEM observations, it was clear that also in the case of dried coating films formed by glass pastes, Examples 2-1 to 2-5 using the binder resins of the present invention were greatly improved in terms of film qualities, such as smoothness and denseness, in comparison with Comparative Examples 2-1 to 2-2. That is, it was clear that the binder resin of the present invention exhibits excellent results when incorporating not only conductive particles, but also a variety of inorganic particles, such as glass particles.

Therefore, it was confirmed that a dried coating film formed using the binder resin of the present invention exhibits excellent homogeneity, and that the binder resin is useful for producing electronic device and the like. The binder resin of the present invention is useful for laminated ceramics, such as capacitors, inductors and resistor chips, and conductive pastes, dielectric pastes, resistor pastes and glass pastes for electronic components.

The invention claimed is:

1. A method for producing a binder resin, the method comprising:
   a preparation step of preparing a cellulose derivative, a polyvinyl acetal and a bonding agent having, in the molecule, 2 or more functional groups which are able to react with hydroxyl groups in the cellulose derivative and the polyvinyl acetal in a reaction step; and a reaction step of mixing the cellulose derivative and the polyvinyl acetal with the bonding agent in a molar quantity that is at least double the molar quantity of whichever is added in a greater number of moles between the cellulose derivative and the polyvinyl acetal, so as to bond the hydroxyl groups to the functional groups.

2. The method for producing a binder resin according to claim 1, wherein the functional groups in the bonding agent are able to react with hydroxyl groups by means of an activator in the reaction step.

3. The method for producing a binder resin according to claim 2, wherein the total molar quantity of the activator added is 1.5-2.5 times the number of moles of the bonding agent added.

4. The method for producing a binder resin according to claim 1, wherein the bonding agent is poly(ethylene glycol) bis(carboxymethyl) ether.

5. The method for producing a binder resin according to claim 1, wherein the molar quantity of the bonding agent added is not more than 15 times the molar quantity of whichever is added in a greater number of moles between the cellulose derivative and the polyvinyl acetal.

6. A method for producing a resin composition, the method comprising:
   a step of preparing the binder resin produced by the method for producing a binder resin described in claim 1, inorganic particles and an organic solvent; and
   a step of kneading the binder resin, the inorganic particles and the organic solvent.

7. The method for producing a resin composition according to claim 6, wherein the inorganic particles comprise electrically conductive particles.

8. The method for producing a resin composition according to claim 6, wherein the inorganic particles comprise dielectric particles.

9. The method for producing a resin composition according to claim 6, wherein the inorganic particles comprise electrically resistive particles.

10. A method for producing a binder resin, the method comprising:
    a preparation step of preparing a cellulose derivative, a polyvinyl acetal, an activator and a bonding agent having, in the molecule, 2 or more functional groups, which are able to react with hydroxyl groups in the cellulose derivative and the polyvinyl acetal by means of the activator;
    a first stage reaction step of mixing one resin of either the cellulose derivative or the polyvinyl acetal, the activator and the bonding agent in a molar quantity that is at least double the molar quantity of whichever is added in a greater number of moles between the cellulose derivative and the polyvinyl acetal, so as to bond hydroxyl groups in the one resin to the functional groups; and
    a second stage reaction step of mixing a product produced in the first stage reaction step with the other resin of either the cellulose derivative or the polyvinyl acetal and the activator, so as to bond hydroxyl groups in the other resin to the functional groups.

11. The method for producing a binder resin according to claim 10, including a removal step to remove an unreacted bonding agent between the first stage reaction step and the second stage reaction step.

12. The method for producing a binder resin according to claim 10, wherein the molar quantity of the bonding agent added is 2-10 times the number of moles of the activator added in the first stage reaction step.

13. The method for producing a binder resin according to claim 10, wherein the bonding agent is poly(ethylene glycol) bis(carboxymethyl) ether.

14. The method for producing a binder resin according to claim 10, wherein the molar quantity of the bonding agent added is not more than 15 times the molar quantity of whichever is added in a greater number of moles between the cellulose derivative and the polyvinyl acetal.

15. The method for producing a binder resin according to claim 10, wherein the total molar quantity of the activator is 1.5-2.5 times the number of moles of the bonding agent added.

16. A method for producing a resin composition, the method comprising:
    a step of preparing the binder resin produced by the method for producing a binder resin described in claim 10, inorganic particles and an organic solvent; and
    a step of kneading the binder resin, the inorganic particles and the organic solvent.

17. The method for producing a resin composition according to claim 16, wherein the inorganic particles comprise electrically conductive particles.

18. The method for producing a resin composition according to claim 16, wherein the inorganic particles comprise dielectric particles.

19. The method for producing a resin composition according to claim 16, wherein the inorganic particles comprise electrically resistive particles.

20. A binder resin comprising a reaction product of a cellulose derivative, a polyvinyl acetal and a bonding agent having, in the molecule, 2 or more functional groups which are able to react with hydroxyl groups in the cellulose derivative and the polyvinyl acetal, wherein
    the content of the bonding agent is at least double the molar quantity of whichever has a greater number of moles between the cellulose derivative and the polyvinyl acetal.

21. A resin composition comprising the binder resin described in claim 20, inorganic particles and an organic solvent.

* * * * *